United States Patent
Yamane et al.

(10) Patent No.: US 9,316,298 B2
(45) Date of Patent: Apr. 19, 2016

(54) SLIDING MEMBER

(71) Applicant: TAIHO KOGYO Co., Ltd., Toyota-shi, Aichi (JP)

(72) Inventors: Kyohei Yamane, Toyota (JP); Shingo Goto, Toyota (JP)

(73) Assignee: TAIHO KOGYO CO., LTD. (JP)

( * ) Notice: Subject to any disclaimer, the term of this patent is extended or adjusted under 35 U.S.C. 154(b) by 0 days.

(21) Appl. No.: 14/372,224

(22) PCT Filed: Oct. 30, 2012

(86) PCT No.: PCT/JP2012/077990
§ 371 (c)(1),
(2) Date: Jul. 15, 2014

(87) PCT Pub. No.: WO2013/108463
PCT Pub. Date: Jul. 25, 2013

(65) Prior Publication Data
US 2015/0040697 A1 Feb. 12, 2015

(30) Foreign Application Priority Data

Oct. 30, 2012 (JP) .................................. 2012-010293

(51) Int. Cl.
*F16C 33/10* (2006.01)
*F16C 33/20* (2006.01)
(Continued)

(52) U.S. Cl.
CPC ............ *F16H 25/125* (2013.01); *F04B 27/086* (2013.01); *F04B 27/0886* (2013.01);
(Continued)

(58) Field of Classification Search
CPC ...... F16C 29/02; F16C 33/1095; F16C 33/20; F16C 33/201; F16C 33/24

USPC ........ 384/13, 26, 42, 293, 420, 625, 907, 908
See application file for complete search history.

(56) References Cited

U.S. PATENT DOCUMENTS 6,752,065 B2    6/2004  Sugioka et al.
6,921,205 B2    7/2005  Kanayama et al.
(Continued)

FOREIGN PATENT DOCUMENTS

CN    201377515 Y    1/2010
JP    S58080615 U    5/1983
(Continued)

OTHER PUBLICATIONS

International Search Report for International Application PCT/JP2012/077990, date of mailing, Dec. 11, 2012 with English Translation.

(Continued)

*Primary Examiner* — Phillip A Johnson
(74) *Attorney, Agent, or Firm* — Cantor Colburn LLP

(57) ABSTRACT

A swash plate type compressor is arranged with a plurality of semispherical shoes and a disc shaped swash plate. A resin coating is formed on a surface and a rear surface (sliding surface) of the swash plate which slides with the shoe. The resin coating includes a structure whereby multiple hexagonal cylinder bodies are fabricated on a surface of a substrate and an end surface of each cylinder body forms a sliding surface which slides with the shoe. In addition, a honeycomb shaped groove is formed at an adjacent position of each cylinder body forming a storage part of a lubricant O and a container part for foreign objects.
The swash plate can be provided with excellent wear resistance, seizure resistance and lubrication retention.

3 Claims, 3 Drawing Sheets

(51) Int. Cl.
*F16H 25/12* (2006.01)
*F04B 27/08* (2006.01)
*F04B 27/10* (2006.01)
*F16H 53/02* (2006.01)

(52) U.S. Cl.
CPC ........... *F04B27/109* (2013.01); *F04B 27/1054* (2013.01); *F16C 33/205* (2013.01); *F16C 33/208* (2013.01); *F16H 53/025* (2013.01); *F16C 33/1095* (2013.01); *Y10T 74/18336* (2015.01)

(56) References Cited

U.S. PATENT DOCUMENTS

| | | | |
|---|---|---|---|
| 7,878,777 B2 | 2/2011 | Iwanami et al. | |
| 2003/0089223 A1 | 5/2003 | Sugioka et al. | |
| 2003/0111511 A1 | 6/2003 | Kanayama et al. | |
| 2006/0083451 A1 | 4/2006 | Kawagoe et al. | |
| 2008/0050260 A1 | 2/2008 | Iwanami et al. | |
| 2008/0112655 A1* | 5/2008 | Kanemitsu | F04B 27/0886 384/13 |
| 2010/0080497 A1* | 4/2010 | Jaeger | F16C 17/02 384/276 |
| 2010/0261625 A1 | 10/2010 | Hakamata | |
| 2013/0089282 A1* | 4/2013 | Nomura | C21D 1/09 384/322 |

FOREIGN PATENT DOCUMENTS

| | | |
|---|---|---|
| JP | H06014538 U | 2/1994 |
| JP | 2003138287 A | 5/2003 |
| JP | 2004211859 A | 7/2004 |
| JP | 3918516 B2 | 5/2007 |
| JP | 2008088846 A | 4/2008 |
| JP | 201112767 A | 1/2011 |
| JP | 4835360 B2 | 12/2011 |
| JP | 5368898 B2 | 12/2013 |
| WO | 9905425 A1 | 2/1999 |
| WO | 02075172 A1 | 9/2002 |
| WO | 2009041653 A1 | 4/2009 |

OTHER PUBLICATIONS

Extended European Search Report corresponding to Application No. 12865973.7-1608/2806178 PCT/JP2012/077990; Mailed on Dec. 11, 2015.

* cited by examiner

SLIDING MEMBER

CROSS REFERENCE TO RELATED APPLICATIONS

This is the U.S. national stage of application No. PCT/JP2012/77990, filed on Oct. 30, 2012. Priority under 35 U.S.C. §119(a) and 35 U.S.C. §365(b) is claimed from Japanese Application No. 2012010293, filed Jan. 20, 2012, the disclosure of which is also incorporated herein by reference.

FIELD OF THE INVENTION

The present invention relates to a sliding component. In particular, the present invention relates to a sliding component suitable as a swash plate of a swash plate type compressor.

BACKGROUND OF THE INVENTION

Conventionally, a swash plate type compressor for an automobile is a known technology. The following structure has been proposed for preventing seizure between a shoe and the swash plate in this conventional swash plate type compressor. That is, forming an end surface of the shoe which slides with the swash plate into a mid to high shape whereby the center part slightly convexes or forming a coating layer on the surface of the swash plate which slides with the shoe has been proposed (patent document 1 for example). In addition to forming a coating layer on the surface of the swash plate, forming multiple concentric ring shaped grooves and ring shaped peaks has also been proposed (patent document 2 for example). In patent document 2, initial affinity and retention of lubrication is improved by arranging multiple concentric ring shaped grooves and ring shaped peaks.

In addition, forming regular dents and indents on the surface of a thrust bearing has also been proposed in order to improve the sliding properties of a thrust bearing as a sliding component (patent document 4 for example).

CITATION LIST

Patent Literature

Patent Document 1: Japanese Laid Open Patent 2003-138287
Patent Document 2: International Published Patent WO2002-075172
Patent Document 3: Japanese Unexamined Utility Model Application H06-014538
Patent Document 4: Japanese Laid Open Patent 2008-088846

SUMMARY OF THE INVENTION

Problems to be Solved by the Invention

Many of the swash plate type compressors installed in recent automobiles are crutchless types and therefore the swash plate type compressor also usually rotates when the engine is running. In addition, improvements in fuel costs are being demanded recently and as a result power reductions are also be demanded with respect to swash plate type compressors.

Thus, in order to meet these demands, reducing the sliding surface area of a shoe has been proposed as a measure to reduce friction generated when the shoe and swash plate slide together. However, when the sliding surface area of a shoe is reduced in the swash plate type compressor disclosed in the patent document 1, surface pressure at the sections where the shoe and swash plate contacts increases. Consequently, a lack of lubrication between the shoe and swash plate are more likely to occur and a coating layer on the swash plate is more likely to wear.

In addition, the following problems occur when the sliding surface area of a shoe is reduced as in the swash plate disclosed in the patent document 2. That is, cracks are generated in the ring shaped grooves and ring shaped peaks when an impact load is applied to the ring shaped grooves and ring shaped peaks via a shoe as is shown in FIG. 5 and the coating layer is peeled away. Also, when the ring shape grooves and ring shaped peaks of the coating layer are deformed due to sliding with the shoe, the sliding surface area of the shoe and coating layer increases causing further wear of the ring shaped grooves and ring shaped peaks and finally disappear altogether. Furthermore, the ring shape grooves and ring shaped peaks sometimes disappear when objects such abrasion powder etc enter and move around within the ring shaped grooves. As a result, although the swash plate disclosed in the patent document 2 has good affinity it has the disadvantage that the coating layer is easy to wear when surface pressure which affects the swash plate via the shoe is high and the ability to retain lubrication is easily lost.

Means for Solving the Problems

For solving the problems described above, the present invention is a sliding component including a base and a coating layer formed on a surface of the base, the coating layer forming a sliding surface which slides with a movable component wherein the coating layer is formed from a resin coating having a structure wherein multiple hexagonal cylinder shaped bodies or multiple triangular cylinder shaped bodies are fabricated on a surface of the base, the sliding surface is formed by an end surface of an opposite base side of each of the cylinder bodies, a honeycomb shaped groove is formed from spaces between adjacent cylinder bodies, and the interior of the honeycomb shaped groove acts as a storage part for lubrication and a container part for containing foreign objects.

Effects of the Invention

According to the structure described above, because a resin coating is formed by fabricating multiple cylinder shaped bodies it is possible to control wear of the resin coating even under a high pressure state. In addition, the honeycomb shaped groove formed at adjacent positions of each cylinder body acts as a lubrication storage part and foreign objects are contained in the interior of the honeycomb shaped groove. As a result, it is possible to provide a sliding component having good seizure resistance, lubrication retention and capture foreign objects.

EMBODIMENTS FOR REALIZING THE INVENTION

Figure 1:
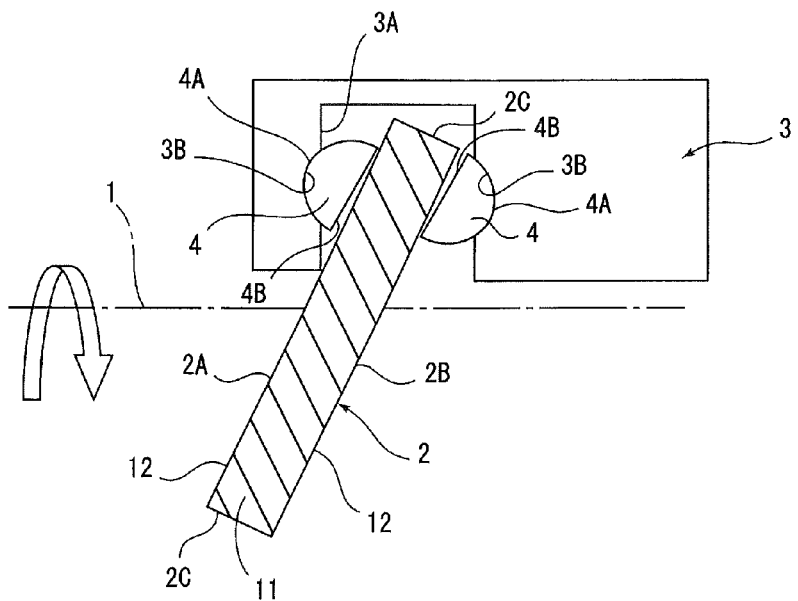
FIG. 1 is a cross sectional view diagram of the main components illustrating one embodiment of the present invention.

The present invention is explained below using exemplified embodiments. FIG. 1 shows the main components of a swash plate type compressor. The swash plate type compressor is arranged with a swash plate 2 as a sliding component arranged at an angle on a periphery part of a rotation shaft 1, a plurality of pistons 3 arranged along the rotation shaft 1 enclosing an exterior periphery part of the swash plate 2 by a notch part 3A at one end, and a plurality of semispherical shoes 4 arranged between a pair of semispherical recessed parts 3B, 3B formed within the notch part 3A of each piston 3 and a surface 2A and rear surface 2B of the swash plate 2. The semispherical shoe 4 is arranged with a semispherical surface 4A which interlocks with the recessed part 3B of the piston 3, and a flat end surface 4B which slides with the surface 2A or rear surface 2B of the swash plate 2. The shoe 4 is comprised from SUJ2 and is finish processed after being tempered to the semispherical surface 4A and end surface 4B.

In addition, when the swash plate 2 rotates with the rotation of the rotation shaft 1, the surface 2A or the rear surface 2B of the swash plate 2 and the end surface 4B of a pair of shoes 4 slide together, the semispherical surface 4A of the pair of shoes 4 and the recessed parts 3B, 3B of the piston 3 also slide together and each piston 3 undergoes a reciprocating motion along the axial direction of the rotation shaft 1.

Figure 2:
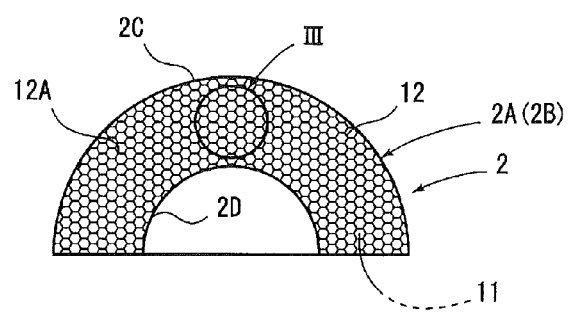
FIG. 2 is a front elevated view diagram of the main components in FIG. 1.
Figure 3:
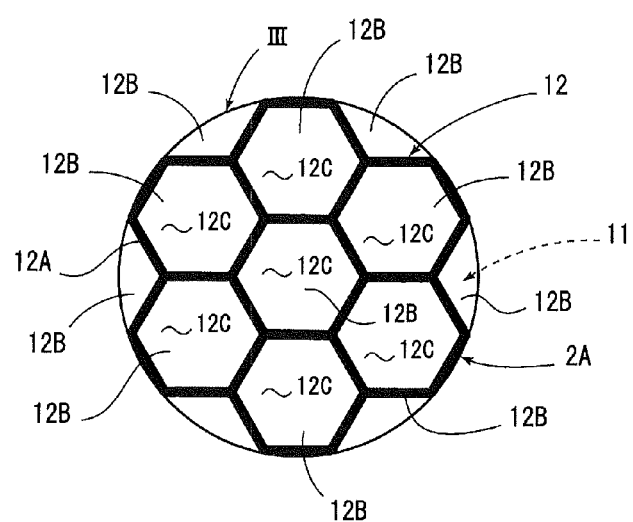
FIG. 3 is an expanded view diagram of the interior of a circle indicated by the arrow III in FIG. 2.
Figure 4:
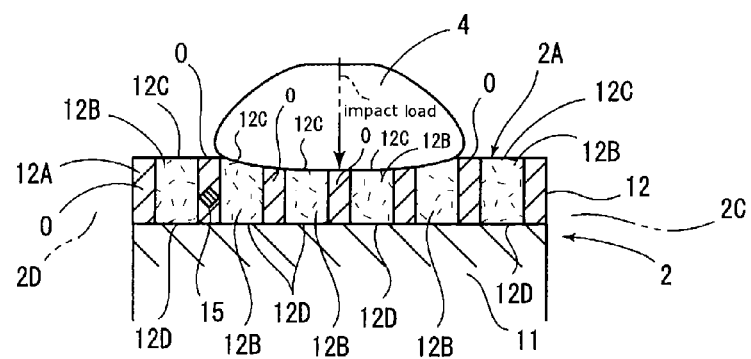
FIG. 4 is an expanded view diagram which shows the operating state of the main components in FIG. 1.
Figure 5:
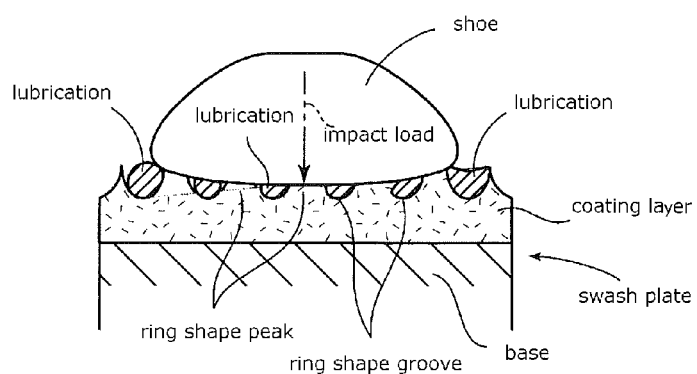
FIG. 5 is a vertical cross sectional view diagram which exemplary shows the main components of a conventional technology.

Then, the present embodiment is characterized by improving the surface 2A and rear surface 2B of the swash plate 2 in the manner described below and improving the sliding properties of the surface 2A and rear surface 2B which become sliding surfaces. That is, as is shown in FIG. 2 to FIG. 4, the swash plate 2 of the present embodiment is comprised from a disc shaped iron base 11 and a resin coating 12 formed on the surface and rear surface of the base 11 wherein the resin coating 12 is arranged with honeycomb shaped grooves 12A.

The resin coating 12 has a structure in which multiple hexagonal cylinder shaped bodies 12B are fabricated in sequence on the surface (and rear surface) of the base 11 so they are adjacent to each other, and a flat end surface 12C on the top side of each cylinder shaped body 12B are all at the same plane. The surface 2A and rear surface 2B which are sliding surfaces are formed by the end surface 12C of each cylinder shaped body 12B. Furthermore, an end surface 12D on the bottom side of each cylinder shaped body 12B is fixed to the surface (and rear surface) of the base 11 (see FIG. 4). Spaces with the same dimensions are maintained by pairs of external surfaces in opposing positions in adjacent cylinder shaped bodies 12B and therefore, as is shown in FIG. 2 and FIG. 3, honeycomb shaped grooves 12A are formed at adjacent positions of each cylinder shaped body 12B in the resin coating 12 on the surface 2A and rear surface 2B. The honeycomb shaped grooves 12A are continuous across the entire resin coating 12 and also form an aperture in an external periphery part 2C and interior periphery part 2D of the swash plate 2. The interior part of the groove 12A which has this honeycomb shape acts as a storage part for accumulating lubrication O and also acts as a lubrication flow path allowing the lubrication O to flow. As a result, lubrication O which is supplied between the shoe 4 and swash plate 2 accumulates in the honeycomb shaped groove 12A and a part of the lubrication O is discharged from the exterior periphery part 2C, 2D of the swash plate 2 via the honeycomb shaped groove 12A with the rotation of the swash plate 2.

Furthermore, the honeycomb shaped groove 12A may also function as a container for storing foreign objects 15 such as abrasion powder. In other words, as is shown in FIG. 4, foreign objects 15 which are smaller than the width of the groove 12A for example are shifted in sequence in a radial direction to the exterior together with the lubrication O through the interior of the honeycomb shaped groove 12A by centrifugal force due to the rotation of the swash plate 2 and are discharged from the exterior periphery part 2C of the swash plate 2. Alternatively, foreign objects 15 which are larger than the width of the groove 12A become embedded and stored between adjacent cylinder shaped bodies 12B.

The thickness of the resin coating 12 of the present embodiment, that is, the height of the cylinder shaper body 12B, is preferred to be about 2~50 µm. In addition, the size of the circumcircle which passes through each corner of the exterior surface of the cylinder shaped body 12B is 0.1~2 mm. Furthermore, the spaces formed by pairs of exterior surfaces of adjacent cylinder bodies 12B are preferred to be about 0.05~0.5 mm or more preferably about 0.25~0.5 mm. That is, the width of the honeycomb shaped cylinder 12A is about 0.05~0.5 mm throughout or more preferably about 0.25~0.5 mm and the depth of the groove 12A is 2~50 µm throughout.

In the present embodiment, the resin coating 12 which includes the honeycomb shaped grooves 12A described above is manufactured by a screen printing on the surface and rear surface of the base 11. Apart from screen printing, pad printing, roll printing, spray coating or dipping methods are also be used as the manufacturing method of the resin coating 12 including the structure described above.

A thermoset resin including a solid lubricant and/or hard particles for example can be used as the material of the resin coating 12. One or more material selected from $MoS_2$, black lead/graphite, $WS_2$, h-BN, a fluororesin such as PTFE, CF can be used as the solid lubricant, one or more material selected from an oxide (alumina, silica), nitride (SiN), carbide (SiC), sulfide (ZnS) can be used as the hard particles and one or more material selected from PAI, PI can be used as the thermoset resin.

As described above, the surface 2A and rear surface 2B which become the sliding surfaces of the swash plate 2 are comprised from the resin coating 12 which includes honeycomb shaped grooves 12A. As a result, the surface 2A or rear surface 2B of the swash plate 2 and the end surface of the shoe 4 slide together and the area of the sliding surfaces of the swash plate 2 at positions which contact with the end surface 4B of the shoe 4 does not change even if wear of the end surface 12C of each cylinder shaped body 12B which forms the sliding surfaces progresses. In other words, because wear of the sections of the surface 2A and rear surface 2B which slide with the shoe 4 is slow and uniform, it is possible to provide the swash plate 2 of the present embodiment with stable sliding properties.

In addition, the resin coating 12 has a structure in which multiple hexagonal cylinder shaped bodies 12B are grouped together and a groove 12A which acts a storage part for lubrication O is formed at adjacent positions of each cylinder shaped body 12B. As a result, because it is possible to retain lubrication O within the honeycomb shaped groove 12A even if the swash plate 2 is rotating at high speed, it is difficult for a lack of lubrication to occur in the sliding surfaces, surface 2A and rear surface 2B (end surface 12C of the cylinder shaped body 12B). In this way, because lubrication O is retained in the honeycomb shaped groove 12A which acts as a storage part, it is difficult for seizure to occur in the sliding surfaces, surface 2A and rear surface 2B. Therefore, according to the present embodiment, it is possible to provide a swash plate 2 which excellent wear resistance and seizure resistance.

In addition, the interior of the honeycomb shaped groove 12A also functions as a lubrication flow path and a storage part for storing foreign objects 15. That is, in the case where foreign objects 15 such as fine abrasion powder enter between the end surface 4B of the shoe 4 and the surface 2A and rear surface 2B of the swash plate 2, foreign objects 15 which are sufficiently small to flow though the interior of the groove 12A are discharged from the exterior peripheral portion 2C or the interior peripheral portion 3D of the swash plate 2 by flowing with the lubrication O within groove 12A. On the other hand, foreign objects 15 which are larger than the width of the groove 12A become embedded between adjacent cylinder shaped bodies 12B within the groove 12A (see FIG. 4). As a result, because it is possible to prevent foreign particles from rolling and moving between the end surface 4B of the shoe 4 and the surface 2A and rear surface 2B of the swash plate 2, it is possible to control damage caused by foreign objects 15 at the end surface 4B, surface 2A and rear surface 2B of the swash plate 2. Therefore, it is possible to improve wear resistance and durability of the swash plate 2 and thus provide a swash plate type compressor with a high level of wear resistance and durability.

Furthermore, in the case where the end surface 4B of the shoe 4 is strongly compressed by the surface 2A or rear surface 2B of the swash plate 2 and an impact load is applied to the swash plate 2 during high speed rotation, it is possible to absorb this impact load by the resin coating 12 comprised of multiple cylinder bodies 12B, and lubrication is promoted when the lubrication O exudes from the interior of the honeycomb shaped groove 12A due to flexible transformation of each cylinder shaped body 12B (see FIG. 4). As a result, it is possible to control cracks occurring when the resin coating 12 wears out due to impact loads.

In addition, because the lubrication O flows through the interior of the groove 12A and thereby cooling each cylinder shaped body 12B, it is possible to control each cylinder shaped body 12B from expanding due to thermal expansion. As a result, it is possible to control the generation of cracks or peeling due to a difference in thermal expansion between the base 11 of the swash plate 2 and the resin coating 12.

Furthermore, even if thermal expansion occurs in each cylinder shaped body 12B in the case where there are no or few cooling effects by the lubrication O when there is a lack of lubrication or under dry conditions, it is possible to absorb this amount of thermal expansion of each cylinder shaped body 12B due to the presence of the groove 12A. It is also possible to control the generation of cracks in each cylinder shaped body 12B in the case. As described above, according to the present embodiment, it is possible to provide a swash plate 2 with excellent sliding properties.

Figure 6:
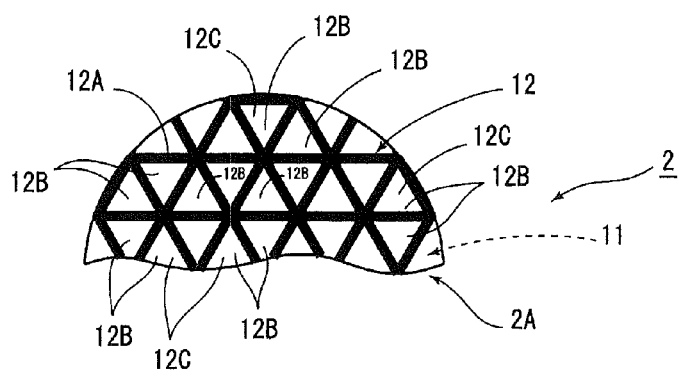
FIG. 6 is a front elevated view diagram which shows another embodiment of the present invention.

Furthermore, although the resin coating 12 of the first embodiment has a structure wherein multiple hexagonal cylinder shaped bodies 12B are fabricated on a surface of the base 11, the resin coating 12 having a structure where multiple triangular cylinder shaped bodies 12B are fabricated on the surface of the base 11 may also be used as shown in FIG. 6. In this example, the same as the first embodiment, the honeycomb shaped grooves 12A are formed with the same groove width throughout. It is possible to obtain the same effects in this example as the effects described in the first embodiment.

In addition, although omitted from the diagrams, the corners of the exterior surface and edges of the end surface 12C of the cylinder shaped body 12B may be beveled in each of the embodiments described above.

Furthermore, although the embodiments described above explain the present invention in the case of application to a swash plate 2 of a swash plate type compressor, needless to say the present invention can also be applied to a thrust washer or thrust bearing as a sliding component.

What is claimed is:

1. A sliding component comprising:
a base; and
a coating layer formed on a surface of the base, the coating layer forming a sliding surface which slides with a movable component comprising:
wherein
the coating layer is formed from a resin coating having a structure wherein multiple hexagonal cylinder shaped bodies or multiple triangular cylinder shaped bodies are fabricated on a surface of the base;
the sliding surface is formed by an end surface of an opposite base side of each of the cylinder bodies;
a honeycomb shaped groove is formed from spaces between adjacent cylinder bodies; and
the interior of the honeycomb shaped groove acts as a storage part for lubrication and a container part for containing foreign objects.

2. The sliding component according to claim 1, wherein the sliding component is a swash plate of a swash plate type compressor, a thrust washer or a thrust bearing.

3. The sliding component according to claim 1, wherein a material of the resin coating is comprised from a thermoset resin including a solid lubricant and/or hard particles wherein one or more material selected from MoS2, graphite, WS2, h-BN, fluororesin, CF is used as the solid lubricant, one or more material selected from an oxide, nitride, carbide, sulfide is used as the hard particles and one or more material selected from PAI, PI is used as the thermoset resin.

* * * * *